(12) United States Patent
Lorrain et al.

(10) Patent No.: US 6,631,137 B1
(45) Date of Patent: Oct. 7, 2003

(54) METHOD AND SYSTEM FOR IMPROVING HIGH SPEED INTERNETWORK DATA TRANSFERS

(75) Inventors: Jean Lorrain, Vence (FR); Pascal Thubert, Vence (FR)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/364,123

(22) Filed: Jul. 30, 1999

(30) Foreign Application Priority Data

Aug. 7, 1998 (EP) ............................................. 98480054

(51) Int. Cl.[7] .......................... H04L 12/28; H04L 12/56
(52) U.S. Cl. ....................................... 370/401; 370/403
(58) Field of Search ........................ 370/401, 402–408, 370/395.5, 395.52, 395.53, 395.54, 466; 709/223, 220, 226, 227, 238, 242, 249

(56) References Cited

U.S. PATENT DOCUMENTS

| | | | |
|---|---|---|---|
| 4,482,999 A | 11/1984 | Janson et al. | 370/86 |
| 4,549,291 A | 10/1985 | Renoulin et al. | 370/89 |
| 4,794,594 A | 12/1988 | Picard | |
| 5,014,265 A | 5/1991 | Hahne et al. | 370/60 |
| 5,072,449 A | 12/1991 | Enns et al. | 371/37.1 |
| 5,128,945 A | 7/1992 | Enns et al. | 371/37.1 |
| 5,260,936 A | 11/1993 | Bardet et al. | 370/61 |
| 5,280,470 A | 1/1994 | Buhrke et al. | 370/13 |
| 5,309,437 A | 5/1994 | Perlman et al. | |
| 5,341,478 A | 8/1994 | Travis, Jr. et al. | 395/200 |
| 5,386,512 A | 1/1995 | Crissman et al. | 395/200 |
| 5,430,842 A | 7/1995 | Thompson et al. | 395/200 |
| 5,491,802 A | 2/1996 | Thompson et al. | 395/200.18 |
| 5,509,006 A | 4/1996 | Wilford et al. | |
| 5,546,549 A | 8/1996 | Barrett et al. | 395/309 |
| 5,555,374 A | 9/1996 | Armerding et al. | 395/200.02 |
| 5,621,894 A | 4/1997 | Menezes et al. | 395/200.12 |

(List continued on next page.)

FOREIGN PATENT DOCUMENTS

GB 2283645 5/1995

OTHER PUBLICATIONS

AIX Version 3.2, "Enterprise Systems Connection Adapter: User's Guide and Service Information," IBM, 1993, pp. 6.1–6.16.
"Chapter 2 Signal Definition," PCI Local Bus, pp. 7–48.
"GT–64011 PCI System Controller for R4640 Processors," Galileo, pp. 29–34.
Thubert et al., Method and System for Improving Traffic Operation in an Internet Environment, US patent application No. 09/302,339, Filed Apr. 29, 2001.

*Primary Examiner*—Ajit Patet
*Assistant Examiner*—Chirag Shah
(74) *Attorney, Agent, or Firm*—Cesari and McKenna, LLP (57) ABSTRACT

A method for creating a single virtual LAN including a source (S) attached to a first Token ring LAN (N1), a target (T) within a subnet attached to a different Token ring LAN (N2), and an interconnecting router (R). The source (S) encapsulates the first packet with a Token ring header including the router MAC address (RMAC), SMAC as source MAC address as layer 2 information, and IP address of T (TIP) as layer 3 data and sends this packet over N1 toward the router. When receiving the first packet, R reads its IP table for best match with TIP address to identify the subnet including T. The net handler runs an ARP protocol to identify TMAC address, substitutes the MAC header with said TMAC address into said first packet destination MAC address field and forwards said first packet over N2. R then sends a conventional ICMP message over N1 limited broadcast and reconfigures itself in proxy ARP for the defined subnet. For the second packet, S runs an ARP and R answers with RMAC address and the RIF data to be used for next packets.

9 Claims, 4 Drawing Sheets

U.S. PATENT DOCUMENTS

| | | |
|---|---|---|
| 5,632,021 A | 5/1997 | Jennings et al. ............. 395/309 |
| 5,636,371 A | 6/1997 | Yu ............................. 395/500 |
| 5,663,952 A | 9/1997 | Gentry, Jr. .................. 370/252 |
| 5,699,532 A | 12/1997 | Barrett et al. ............... 395/309 |
| 5,708,654 A | 1/1998 | Arndt et al. |
| 5,764,887 A | 6/1998 | Kells et al. ................. 395/186 |
| 5,854,901 A | 12/1998 | Cole et al. |
| 5,872,783 A | 2/1999 | Chin |
| 5,884,043 A | 3/1999 | Teplitsky |
| 5,917,820 A | 6/1999 | Rekhter |
| 5,964,831 A | 10/1999 | Kearns et al. .............. 709/201 |
| 6,091,732 A | 7/2000 | Alexander, Jr. et al. |
| 6,108,300 A | 8/2000 | Coile et al. |
| 6,115,385 A | 9/2000 | Vig |
| 6,262,988 B1 | 7/2001 | Vig |

METHOD AND SYSTEM FOR IMPROVING HIGH SPEED INTERNETWORK DATA TRANSFERS

FIELD OF THE INVENTION

The present invention deals with a method and system for improving high speed internetwork data transfers. More particularly, the invention is intended to interconnect Token ring/IP Hosts over Token ring Local Area Networks (LAN) and a Wide Area Network (WAN) by creating one way bridged path for host-to-host connections, using IP routing protocols to create the path, so that the LAN virtually enlarges till it encompasses the WAN with bridging getting everywhere.

BACKGROUND ART

Modern digital networks are made to operate over different transmission media and interconnect, upon request, a very large number of users and applications through fairly complex digital communication networks.

Accordingly, due to the variety of users' profiles and distributed applications, the corresponding traffic is becoming more and more bandwidth consuming, non-deterministic and requiring more connectivity. This has been the driver for the emergence of fast packet switching techniques in which data from multimedia origin are chopped into fixed length packets (e.g. in Asynchronous Transfer Mode (ATM) type of operation) or in variable length packets (e.g. in so called Frame Relay (FR) type of operation). These packets are then transferred upon request for communication purposes between data sources and targets via so-called high speed communication networks. One of the key requirements for high speed packet switching networks is to reduce the end to end delays.

Also, due to the incredible increase of traffic, several types of networks have been installed which need to be interconnected to optimize the possibilities of organizing traffic between a source host terminal and a target host terminal, both located anywhere. This is made possible by using so-called internetworking (also referred to as internet). An internet is a collection of heterogeneous networks using a set of networking protocols (TCP/IP, i.e Transmission Control Protocol/Internet Protocol) developed to allow cooperating computers to share resources across the network. TCP/IP products are made by vendors and a fairly large number of networks of all kinds use it. Accordingly, the considered IP switching technologies may incorporate new proprietary protocols, which complicates inter-networking operations.

TCP/IP is a set of data communication protocols that are referred to as the internet protocol (IP) suite. Because TCP and IP are the best known of the protocols, it has become common to use the term TCP/IP to refer to the whole family. TCP and IP are two of the protocols in this suite. Other protocols that are part of the internet suite are User Datagram Protocol (UDP), Internet Control Message Protocol (ICMP), Address Resolution Protocol (ARP), Real Time Protocol (RTP) and Reservation Protocol (RSvP).

An Internet is a collection of heterogeneous networks using TCP/IP. The administrative responsibilities for an internet (for example, to assign IP addresses and domain names) can be within a single group or distributed among multiple groups. Networks comprising an internetwork can use either the same or different technologies.(For more information on TCP/IP one may refer to the book "Internet working with TCP/IP" by Douglas Comer).

Host stations attached to LANs can send messages from any of them to any other. Communication within a single (LAN) network is referred to as intranetworking, and communications between stations that are attached to different LAN networks is called internetworking. Stations within a same network can communicate directly, while internetworking communications have to go across special internetworking devices called gateways and possibly referred to as routers as they route data from one network into another.

As shall be emphasized in the following description, the routers may, in some cases be replaced by so-called bridges. Both have specific characteristics as they operate at different layers of protocols of the network.

As networks have developed, various approaches have been used in the choice of communication characteristics such as communication medium, network topology, message formats, protocols for channel access etc . . . . Some of these approaches have been converted into standards. A model of these standards is known as the International Standards Organization (ISO) Open System Interconnection (OSI) model. This model specifies a hierarchy of protocol layers and defines the function of each layer in the considered network. Each layer in one station which might be a host computer or a Router/Bridge carries a conversation with the corresponding layer in another station with which communication is taking place, in accordance with the protocol defining the rules of this communication. In fact, information is transferred down from layer to layer in one host or router then through the channel medium and back up the successive layers in the other host or router/bridge (target). Accordingly, the higher the layer at which communication operations are performed, the longer and more cycle consuming the process.

IETF standardizes TCP/IP through RFCs (Requests For Comments).The three layers (out of seven) defined by the OSI Standards and to be considered here include the physical layer, the data link layer and the network layer. The physical layer is the lowest layer (i.e level 1) assigned to transmission of data bits over the communication channel. Design of the physical layer involves issues of electrical, mechanical or optical engineering, depending on the physical medium used to build the communication channel.

The layer next to the physical layer, is the data link layer (i.e. level 2). The main task of the data link layer is to transform the physical layer interfacing with the channel into a communication link that appears error-free to the next above layer, i.e. the network layer (level 3). The data link layer performs such operations as structuring data into packets or frames and attaching control information and numbers to the packets or frames to enable checking data validity and reinserting reconstructed packets at the right location into the data flow. There are two point-to-point types of connections i.e. connectionless and connection oriented connections.

Although the data link layer is primarily independent of the nature of the transmission medium, certain aspects of the data link layer functions are dependent on the transmission medium. This is why, in some network architectures, the data link layer is divided into two sublayers: a logical link control sublayer which performs all medium-independent functions of the data link layer, and Media Access Control (MAC) sublayer. The MAC sublayer determines which station should get access to the communication channel, when requests for access are in conflict. The functions of the MAC sublayer are more likely to be dependent on the transmission medium. Bridges may be designed to operate in the MAC sublayer.

As internetwork topologies become more and more complex, the number and significance of routers or bridges used to interconnect the network both increase. Consequently, the choice between these two devices for performing the interconnecting function may seriously impact the whole internetwork performance, e.g. in terms of transmission time delay.

The basic function of a bridge is to make large interconnected networks look like a single flat LAN. A bridge acts at the MAC layer and listens to all message traffic on all networks (e.g. LANs) to which it is connected, and forwards each message onto the networks other than the one from which the message was received. Bridges also maintain a database of station locations derived from the content of the messages being forwarded. After a bridge has been in operation for some time, it can associate practically every station with a particular link (i.e. path) connecting the bridge to a network (e.g. LAN) which contributes to speeding up the traffic.

There are two main types of bridges which are: Transparent Bridges (TB) and Source Route Bridges (SRB). There are also combinations of these (SRTB).

If several networks are connected by bridges and form a closed loop, a message may be circulated back to the network from which it was originally transmitted, which may flood the internetworking facility and jam the traffic. To prevent the formation of such closed loop, a so called Spanning Tree algorithm has been developed to connect the bridged networks into a tree configuration containing no closed loops. The spanning tree algorithm is executed periodically by the bridges on the interconnected network to ensure that the tree structure is maintained up-to-date, even if the physical configuration of the network changes.

While the basic advantage of the bridge (i.e. transparency to layer 3) is the rapidity of message transfers, these transfers operating at data link level (i.e. layer 2), some traffic overflow may be due to bridge transparency. For instance this is the case with TCP/IP traffic caused by so-called Address Resolution Protocol (ARP) messages made to obtain, when required, a data link layer address from the corresponding network layer address. ARP packets can be duplicated by bridges and storm the whole internetwork, possibly disrupting normal traffic flow. But as far as this invention is concerned it should essentially be recalled that bridges are transparent to broadcast messages which shall then multiply and propagate through the whole internetwork.

A router unlike a bridge, operates at the network layer level (layer 3) instead of the data link layer level, and is fundamentally meant to interconnect unlike network technologies and provide a structured address space (routing based on global address). Addressing at the network layer level, as obtained by the content of data packet address field includes a unique network identifier and a target identifier within the network. A router learns the topology of the network and builds a routing table to represent it. IP tables are established manually or through routing protocols (RIP, OSPF etc . . . ), where routers learn how to reach networks.

Routers make use of the destination network identifier in a message to determine an optimum path from the source network to the destination network. But as far as the present invention is concerned it should be noted that broadcasted messages shall be stopped by any reached router. Consequently routers provide a better isolation than bridges at the expense of processor utilization.

Thus, the network designer has to deal with conflicting situations and choose between routing and bridging operations.

Compromises to these kinds of situations have been proposed in the art. Some have an impact on source and/or target hosts software. Given the fairly wide variety of hosts already in the field no simple and unique solution to the problem raised may be proposed. Other solutions, like for instance the solution recommended by U.S. Pat. No. 5,309, 437, address extended LANs and use so-called bridge-like routers including both functions. Then, depending on the type of traffic, either one of the functions is called for use. Unfortunately, during ARP operation all normal traffic is made to suffer. An improved solution to internetworking operation has been proposed in a copending European Patent Application "A Method for Improving High Speed Traffic Operation in an Internet Environment and System for Implementing said Method", filed on . . . (FR998010), and assigned to the same Assignee. This application enables speeding up internetworking by providing the network and more particularly the routers with self bridging facilities dynamically converting the used router connections into bridged connections during traffic operation. In other words, transparent bridging is performed, as required, by dynamically building up Bridge tables into the routers establishing direct level 2in-out connections. While the best mode of implementation addresses Ethernet LANs, the invention applies to routers inter-connecting most LANs, including so-called Token Ring. But as far as Token ring LANs are concerned the proposed solution is not optimal.

OBJECTS OF THE INVENTION

One object of this invention is to enable improving high speed data transfers in an internet environment by using Internet Protocol (IP) intelligence as well as Token-ring facilities to optimally drive self-bridging configuration of conventional routers.

Another object of this invention is to enable improving high speed data transfers in an internet environment by using IP intelligence and Token ring specifications to enable optimally self configuring routers into bridges, dynamically, during data traffic on the specific paths used for connections toward a designated target host.

A further object of this invention is to enable improving high speed data transfers in an internet environment requiring only limited broadcasting to enable self-configuring routers into bridges.

Another object of this invention is to provide a solution for efficiently self configuring routers into bridges on paths set between source and target hosts respectively attached to different token-rings.

The foregoing and other objects, features and advantages of this invention will be made apparent from the following more detailed particular description.

SUMMARY OF THE INVENTION

This invention deals with a method for improving high speed traffic operation in an internet environment using standardized protocols of the so-called Internet Protocol (IP) suite, by speeding up data packet transfers between a source host (S) attached to a first Token ring Local Area Network (LAN) (N1), and a target host (T) within a subnet attached to a different Token ring LAN (N2), both LANs being interconnected by a router (R) establishing connections at OSI Standard network level (layer 3) through use of an IP table, by dynamically setting, during traffic operation, a single virtual LAN.

The source host (S) encapsulates the first packet to be sent with a conventional Token ring header including RMAC as destination Media Access Control (MAC) address of R, SMAC as source MAC address and an empty Routing Information Field (RIF) as layer 2 information, and IP address of T (TIP) as layer 3 information.

Upon receiving the first packet, router R reads its IP table for best match with TIP address whereby the subnet including T is identified. The net handler runs an ARP protocol to identify TMAC address, stores it in its ARP table, substitutes MAC header with said TMAC address into said first packet destination MAC address field and forwards said first packet over N2. Router R then sends a conventional Internet Control Message Protocol (ICMP) over N1 as limited broadcast, whereby all hosts, including S, add a direct route toward T's subnet on their interface to N1; R configuring itself in Proxy ARP for the defined subnet.

The second packet is passed by S to its N1 interface with TIP address. S runs a conventional Address Resolution Protocol (ARP) by sending an ARP request carried over an All Route Broadcast (ARB) with TIP address over N1 and R answering with RMAC address and the RIF data leading to N2. Then the second packet is sent over N1 with TMAC, SMAC, the defined RIF and TIP data.

Upon receiving the second packet, the router R bridging function identifies RIF data, and bridges the packet to its net handler toward N2. Router R's net handler runs an ARP process to substitute R's MAC address to TMAC address.

DETAILED DESCRIPTION OF A PREFERRED EMBODIMENT OF THIS INVENTION

On both Ethernet and Token ring LANs, a transmission link may be shared by all attached host stations, which can lead to possible traffic collisions unless some additional mechanism is used. This is why the Token-ring networking has been provided with a so-called token which enables the host using the token to monopolize the link for a while and prevent other hosts from using same link simultaneously.

Also, as far as internetworking approaches are concerned, routers are conventionally used to interconnect different LANs be they Ethernet LANs or Token-ring LANs respectively into a internet. Bridges can be used instead of routers to reduce data manipulations and delays but the price for that is an increased use of bridging tables, which become more complex as the extended LAN becomes larger.

A solution to this problem has been provided by the above mentioned copending European Application which uses routers which are then selectively converted into transparent bridges by dynamically building up transparent bridging tables matching corresponding source MAC addresses with destination MAC addresses. This approach is suitable particularly for Ethernet networks but can also be implemented for Token-ring networks. However, the disadvantages of bridging tables extensions can be overcome with the present invention, taking advantage of Token ring operating characteristics. In effect, while the path between a source and a destination attached to an Ethernet LAN are memorized within interconnecting bridges, token rings operate differently. In token ring operation, the path connecting a source host to a destination host is included in the traffic frame (packet). To that end, the Token ring frame includes a Routing Information Field (RIF) storing the information for routing the frame from source to target through all possible hops. Accordingly, a RIF for a virtual LAN, i.e. Token ring LANs interconnected via routers, is be constructed to configure the LANs into bridged Token ring LANs. The invention shall enable dynamically building-up the RIF during traffic operation. Normal SRB bridges allow building of the RIF by flooding (Broadcast). This invention uses the IP mechanism (OSPF) to build RIFs without broadcast.

Figure 1:
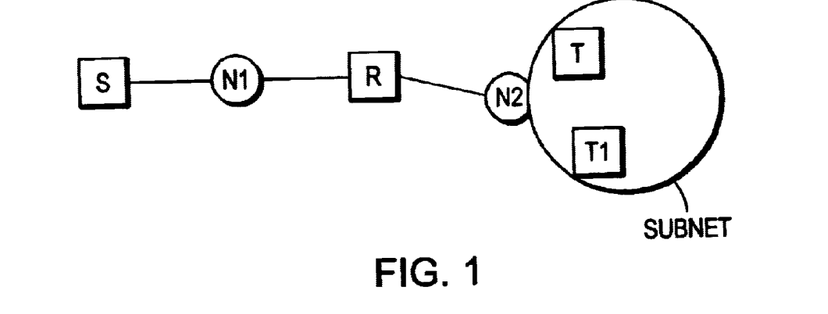
FIG. 1 is made to illustrate a simple network configuration wherein the invention shall be implemented.

FIG. 1 illustrates the simplest network configuration for applying the invention.

Assume source host (S) attached to a Token ring network (N1) needs to communicate with a target host (T) attached to a different Token ring network (N2). Both networks N1 and N2 are interconnected via a router R. As mentioned the system is dynamically reconfigured into a single bridged LAN. More precisely, the proper router and system intelligence creates the bridged LAN while traffic is being sent from S toward T.

As the bridge has the appearance of the reporting sub-network portion to which the target T is attached, the invention is also applicable to multiple Token-rings interconnected by routers and located between source (S) and target (T). This feature and others shall become apparent, from the following description extended to a complex network including different types of LANs.

As already mentioned, the data to be transported over a network are split into packets and organized into datagrams or frames. Each frame includes, in addition to the data to be provided to target host (T), header information used for defining a number of characteristics assigned to the frame, as well as for validity checking (Frame Checking Sequence: FCS) received and, if required, discarding frames having errors.

Each host keeps the set of mappings between destination IP addresses and the IP addresses of the next hop for those destinations in a table called the IP Routing Table. Three types of mapping can be found in this table, i.e: direct routes for locally attached hosts; indirect routes for networks known for being reachable via one or more routers; and a so-called default route which contains the IP address of a router to be used for all IP addresses which are not covered by the direct and indirect routes.

Another conventional tool used here and available in network operating protocols is the Address Resolution Protocol (ARP) which is a broadcast at layer 2 and which helps obtaining a LAN address corresponding to an IP address when this IP target is on the same LAN or bridged LAN as the IP source. This information is stored in ARP tables. The ARP protocol is performed used by broadcasting ARP requests. Every host listens to ARP requests and upon recognizing its own IP address, responds with its MAC address. The ARP requester saves this information in its ARP table. In other words, ARP is the protocol used to dynamically bind a high level IP address to a low level physical address. Normally, ARP is only across a single physical network. But a router (R) receiving an ARP message may operate in Proxy ARP mode and answer an ARP request on behalf of the ARP target. In this application, as developed hereunder, R adds the target's subnet in its Proxy ARP support.

Also, the Internet Control Message Protocol (ICMP) is used to implement the bridging method of this invention. This protocol was originally intended for error messages and other control messages. Specifically, gateways (e.g routers and bridges) as well as hosts use ICMP to send reports of problems about frames, back to the original source that sent the frame. ICMP messages are sent in IP form.

Figure 2:
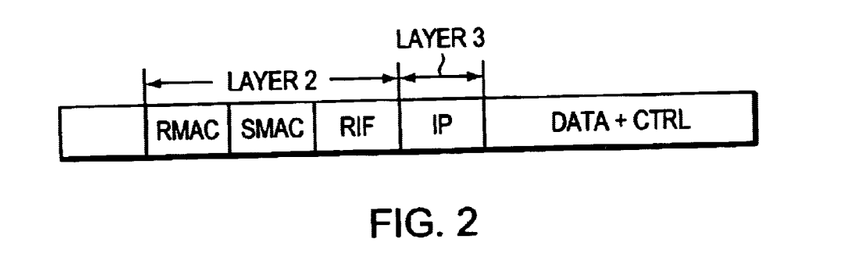
FIG. 2 is a simplified representation of the first data packet as used with this invention.

Referring again to FIG. 1, assume the source (S) host needs to send an IP packet to the target host (T). To that end, S uses its IP routing table which designates the next hop to reach T. Assuming R has been designated as the default router for S, then through its IP routing table S, determines that the router R, reached through Token ring network N1, is the next hop to reach T. If R's MAC is unknown, an ARP will be used to resolve it and store it in S's ARP cache. S encapsulates the IP packet in a conventional 802.5/Token ring header and sends it over N1. The useful portion of said packet header has been represented in FIG. 2. Accordingly, the layer 2 field is filled up, i.e. the destination MAC address field is made to include RMAC address, the source MAC address field shall include SMAC address and the RIF field remains empty for the moment. The destination layer 3 field shall include IP address of target (T), i.e. TIP. For next hop toward final target through N2, destination and source MAC addresses fields shall be made to include TMAC address and RMAC2 address, respectively, once R has determined through its IP routing table that the target T is located on the network N2, which is not on the same interface as N1. R will ARP TIP over N2 to get TMAC and will cache it. R may then forward the packet to T through N2.

The (R) IP table is checked for best match between destination (T) MAC address and the IP table content, and this defines a so-called subnet including (T). To that end, the IP addresses format is designed to include a network field in the most significant bits field and then a user's field using the least significant bits. By doing so, one may then, in a complex network localize more and more precise subnetworks including T, down to last Token ring including T.

Once the subnet including T has been defined, and if it appears that the router R has a direct route to that subnet, which means that the subnet is included in one of the networks attached to R, the router sends a conventional ICMP redirect to the source host (S), implying that T's subnet is on N1. This is done by sending the ICMP redirect from R over N1 as a limited broadcast, specifying that the packet can be passed directly to T. All hosts on N1, including S, will receive that ICMP message and add a direct route to T's subnetwork in their routing table or in other words, S adds a subnet direct route to T on its interface to N1. Normal routers ignore that message. In other words, while in the above mentioned copending European Application dealing with self bridging over Ethernet attached routers, the target host was reported upward toward the source network, in the present application a whole subnet including the target is reported upward toward the source network. The RIF ensures that a packet will not be forwarded by two bridges.

R should configure in Proxy ARP for the considered subnet including T, i.e. be ready to answer any ARP for any IP address on N2.

Thus, when S needs to send a second packet to T, S's routing table will now indicate there is a direct route to T, so S will pass the packet to its interface on N1 with T's IP address being next hop. The network handler in S will perform a look up for that entry in its ARP table. If the address is not found, which is the case the first time a packet is to be forwarded from S to T, S broadcasts an ARP request for T's IP address (on an All Route Broadcast), that R will respond with a bridge MAC address. In other words, R provides for the whole subnet including T a single MAC address, i.e. RMAC address. T's MAC address is thus not reported upward as was the case with the above mentioned copending European Application. The whole subnet is reported instead. This means that for a different target T1 attached to same subnet as T (see FIG. 1) R shall respond as well since R is now configured as Proxy for all packets whose IP address matches with the subnet. No transparent bridging table is thus needed, but R has to add information in the RIF field to indicate on which LAN and which port the packet should be oriented. The overall result simulates a bridging.

Figure 3:
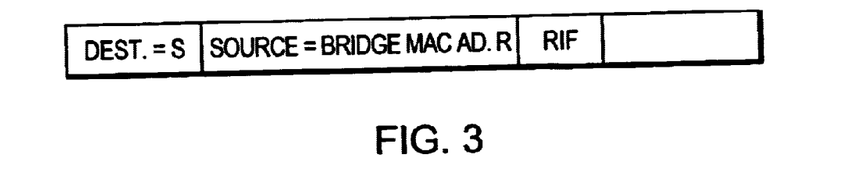
FIG. 3 is a so-called ARP response format to be used in this invention.

Represented in FIG. 3 is R's ARP response format mentioning S as destination, R as source with its bridge MAC address and including the RIF information specifying the concerned LAN and exit port.

The second packet to be sent by S may now include the RIF data enabling R to bridge said packet toward the adequate subnet section (i.e. the network on which T is attached), that is in the simple case of FIG. 1, the Token ring N2.

Figure 4:
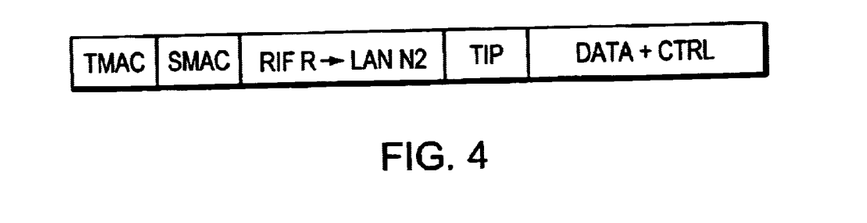
FIG. 4 is made to illustrate a packet header section used in the process of this invention.

FIG. 4 is a representation of layer 2 header section to be assigned to the second packet including RMAC address as destination MAC address, SMAC as source MAC address and, as RIF content, the information forwarded to S by the router to enable bridging toward N2. The layer 3 field shall indicate T's IP address.

Accordingly, the new packet for T is sent by S to T's IP address, with RMAC address as destination, over N1. R bridging function recognizing RMAC address and RIF data and using its ARP table for router exit port shall find the correct T's MAC address, substitute T's MAC address to the destination MAC address header field content in the considered packet and forward the packet into N2.

But assuming this second packet was for T1 different from T but located on same subnetwork, the router R shall have to develop ARP protocol to get T1 MAC address and upon receiving the ARP response, R shall substitute the T's MAC address to the bridge MAC address in the packet header, as destination address (see FIG. 4) and forward the packet over the network down to T1 (i.e. N2 in the present situation).

A man skilled in the art shall, undoubtedly, fully appreciate the many advantages of the proposed method which, since it does not shift upward toward source network each target MAC address, enables globalisations. Therefore, in a complex network, the further the target network is from the source network, the larger the bridged subnet is. This enables getting rid of the hassle of too important transparent bridge tables to be stored. This is thus a backbone like function. Also, since the packet is received with a bridge MAC address of R, only the router R shall copy it, which renders the process rather economical.

In conclusion, the existence of the RIF field in the token ring frame format enabled using R proper MAC address for a globalized network, but to focus the routing on the router exit port an ARP protocol is run to build up the required RIF field content.

As compared to the Ethernet method of the above mentioned copending European Application, the present method needs thus an additional ARP to focus the routing and an additional ARP table.

Also, the present approach may be extended to Ethernet LAN networks but since the RIF field would not be available in the frame format to be used, the number of bridge MAC addresses required would be equivalent to the number of exit ports on R.

Extension to a global network including both Token ring LAN sections and Ethernet LAN sections would require only the insertion of conventional so-called translational bridging facilities in between.

If S sends a directed broadcast to T's subnet, it will be broadcasted over N1 since S thinks that T is on N1. But R bridging function will recognize MAC level broadcast and pass up the packets to upper layer for routing instead of bridging. The router should drop the packet as it is a MAC level broadcast, but it recognizes the target subnet is actually bridged, so it routes the packet using normal IP routing.

Figure 5:
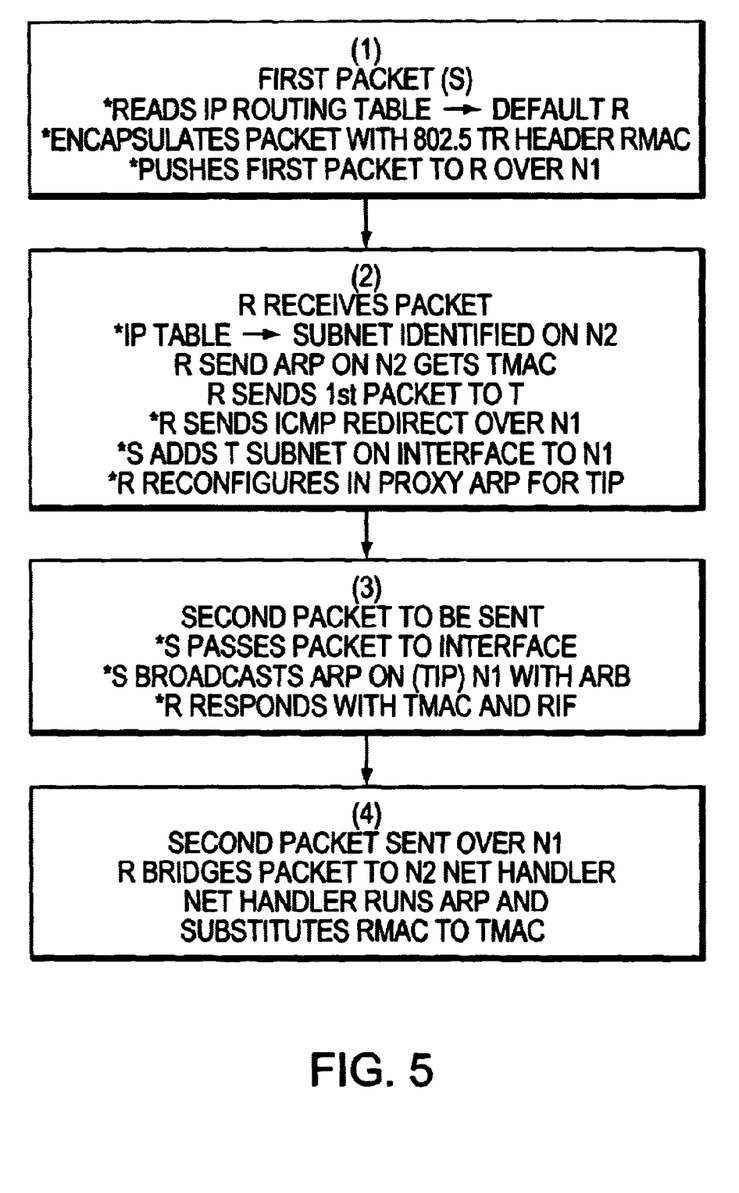
FIG. 5 is a flow-chart to be used for implementing the invention.

The basic process of this invention as described above has been summarized in the flowchart of FIG. 5 which enables a man skilled in the art to implement the invention without any additional inventive effort being required.

First step: first packet to be sent from S to T
  S reads IP routing table. Since no path was already set-up to route the packet, S selects the default router R.
  S encapsulates 1st packet with a 802.5/Token ring header:
    layer 2: *destination MAC address=RMAC
      *source MAC address=SMAC
      *RIF field=RIF to R
    layer 3: *TIP address (see FIG. 2)
Second step: R receives first packet
  R reads IP table for best match with TIP address→"subnet" including T is identified.
  R sends ICMP redirect over N1 as limited broadcast:
    all hosts (including S) add "subnet" as direct route toward T on their interface to N1.
  R adds T subnet in Proxy ARP support
Third step: second packet to be sent
  S passes packet to its N1 interface
  S broadcasts, on N1, ARP request for T's IP address
  R responds with RMAC address and RIF data leading to N2,
=R configures in Proxy ARP for the "subnet" (see FIG. 3)
Fourth step: second packet is sent over N1 to TIP address with RMAC address as destination and with the RIF data,
  R bridging function receiving 2nd packet with RMAC address,
  identifies RIF data,
  reads ARP table for exit port (or runs ARP protocol to identify TMAC address and store it)
  substitutes T's MAC address into the second packet header destination MAC address field
  R forwards 2nd packet over N2.
whereby a virtual LAN has been set with R being bridged for the considered target subnet.

Figure 6:
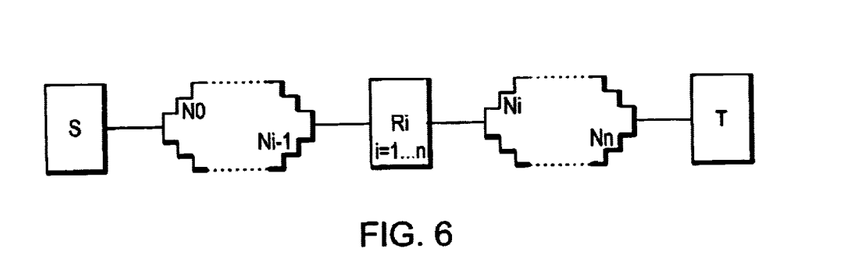
FIG. 6 is a schema tical representation of an extended network including a cascade of LANs as illustrated in FIG. 1.

The network of FIG. 1 can be extended by cascading consecutive Token ring LAN networks as schematically represented in FIG. 6. The source (S) is now located on LAN $N_0$ and should be connected to target (T) on LAN $N_n$, through successive Token ring LAN networks $N_1$, $N_2$ ..., $N_{n-1}$, $N_n$ interconnected by routers $R_1$, $R_2$, $R_{n-1}$, $R_n$ respectively. In the simple case of FIG. 1, the device that pushed the IP packet over the network next to target was a host. In the cascade of successive Token rings the device pushing the packet over the network may be a router (e.g. $R_{n-1}$). As far as router $R_n$ is concerned, this makes little difference. $R_n$ can assume the role of the router R and simulate T, performing the requirements of the router expressed in the simplest case (see FIG. 1). This works because $R_n$ determines that T is directly attached to it. Accordingly R still broadcasts the ICMP redirect as a limited broadcast over network $N_n$.

But in the case of an extended network as represented in FIG. 6, the router $R_{n-1}$, is required to accept the ICMP redirect that is usually received by hosts. Like a host, it will add a subnet entry into its routing table. At this point $R_{n-1}$ sees that T is attached to it. The entry will be flagged so that it is not used for directed broadcasts. $R_{n-1}$ will accept the redirect only if it comes from the network that the routing table indicates as the network to the next hop, and if the destination of the packet is the advertised hop. In other words, only direct routes on the right path will be added to the routing table.

When the next packet for T is received by $R_{n-1}$ over one of its interfaces, $R_{n-1}$ will now assume the role of router R in the simpler case (i.e. of FIG. 1). But as the route to T subnet was added through ICMP, $R_{n-1}$ knows that it is not the last router to T. So, unlike $R_n$, $R_{n-1}$ will not substitute the MAC address, but will only add to the RIF to represent the hop between $N_{n-2}$ and $N_{n-1}$, when building an ARP response for $R_{n-}$. Then, the process propagates upward with R role being played for the next packet by $R_{n-2}$, $R_{n-3}$, ... till $R_1$ respectively. At this point, a fully bridged connection is established between S and T.

The RIF field is thus constructed progressively with the successive packets distribution representing the hop from $N_1$ to $N_n$, while the MAC address is $R_n^1$s. But since the RIF field capacity is limited, its size being predefined by standards, this limits the number of hops, so only close hosts can be bridged end to end. Then, for fairly large numbers of interconnected Token rings, the bridge shall extend up to full RIF. Then, if a router has a direct route to subnet but the ARP to it has a full RIF field, it will simply not use the RIF to bridge from there. The alternate is to advertise the transmit MAC address on the receive side upon ARP requests as a bridge address, then the transmit side is found easily.

Therefore, the process as developed with reference to FIG. 1, with a unique router, can be extended to the more complex network of FIG. 6 throughout the transmission of successive packets from S to T. The system starts with one router and then recursively extends upward, up to full RIF field.

Figure 7:
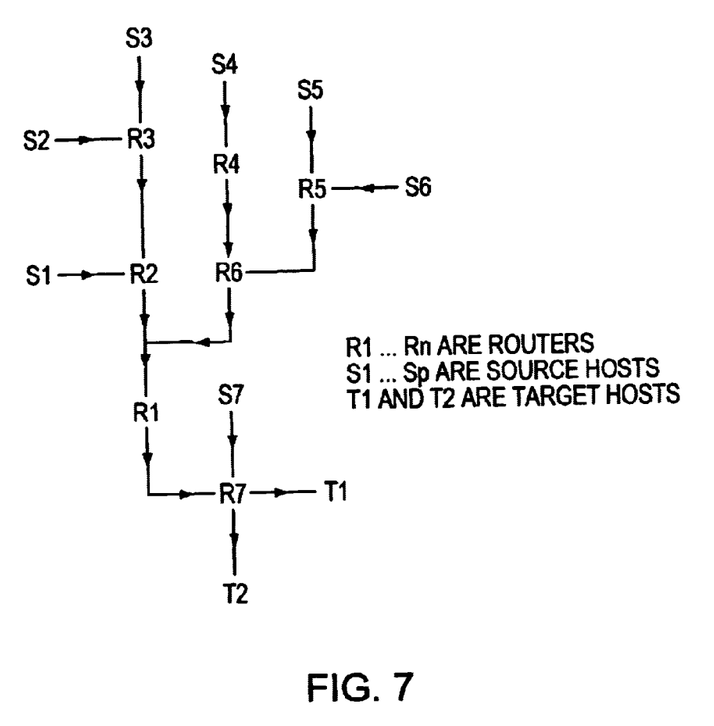
FIG. 7 is made to illustrate an application of this invention to several source and target hosts.

Further extension of the process of this invention as disclosed above, to a more complex network should include considering the case of several sources (S) needing to reach same target(s) T. Such a so-called "water basin" topology is schematically represented in FIG. 7 showing a schema tical representation of paths between source hosts (S1 through S7) and targets T1 and T2, via routers (R1 through R7).

In operation and given the process as developed above, one may understand that wherever the first packet, say for target T1, came from, it caused the last router before T1 to bridge T1 subnet. Then the connection builds up one hop, upon any new incoming packet in the direction of the source. The new construction will add the last router in the IP path to T1 subnet that was not already set. The first router that was already in the connection for that packet's path may have been added for a different source and target, but both sources share the same rest of the way down to T's subnet in the routing tables and all the targets are on the same subnet.

After some time, the bridged network looks like the flow of a river, growing larger as the Target approaches, getting more traffic from merged connections.

For example, Say that S1 sends the first packet. Upon that packet, R7 decides to simulate T1's subnet for the network R1. So R7 sends an ICMP redirect to R1. Upon the second packet from S1 to T1, R1 now simulates T1's subnet for the network to R2 and R6. After the third packet, S1 has a bridged path to T1 and T2.

Now, S3 sends a packet to T2. Since R3 and S1 are on different networks, R2 did not simulate T2's subnet towards R3. But R1 still does it to R2. The end result is that R2 will now simulate T2's subnet towards R3. Upon the next packet from S3, R3 will simulate T2's subnet towards both S2 and S3. So if S2 needs to send a packet to T1, the connection will take place right away. The same approach may apply to routers R4 and R5 for the sources S4, S5 and S6.

When T1 responds to the sources, a similar water basin is created the other-way.

Let's now consider how the system may keep alive during conventional network operating situations. The next hop to which a router on the path bridges the traffic may sometime be down or the physical medium to it may be down. If every router guarantees the next hop, then it can be expected that the whole path is available from the first router to the target.

To cover the case where the next hop is not available for bridge any longer, ARPs are sent on a regular basis (30s) for those subnet addresses that were learned through ICMP redirect. Also, when the routing table is updated by the routing protocols, the router checks that new computed path to the target is through the same next network as the path that was used to create the bridged connection. If ARP fails or if the next network changes, then:

- the ICMP redirect added entry to the lost subnet address is deleted from the routing table.
- the router also removes all the bridge entries to the failed resources.

Proxy ARP is not provided anymore for the lost subnet.

A conventional ICMP redirect is sent over the networks from which a bridge existed to the failed resource, now providing the next hop router (indirect route) found in the routing table. The ICMP redirect again is a limited broadcast, specifying the right next hop router. All hosts on N1 including S will receive that ICMP message and modify the network entry in their routing table.

The invention requires that the routers process the ICMP redirect for indirect routes to subnets by periodically performing the above cleanup as if ARP failed, so that the whole tree is cleaned up.

If a hop is lost, the connection shall attempt to get around it using the routing protocols best route from there.

Down to this point, and as illustrated in the figures, we have only considered LAN networks and more particularly Token rings, with a possible implementation over Ethernet networks. To go further and extend the global network by going up to the so-called Internet other network (e.g. Frame Relay FRF3) encapsulating operations (without CRC), or mapping operations (e.g. 802.5/802.3 conversions) are required.

When going to or coming from a Token ring network, there is thus no specific requirement on the host itself. Traditional Bridge SRTB conversion 802.5/802.3 may take place when a router has one leg on a Token ring/WAN and the other leg on an Ethernet LAN. Ethernet Format can still be used when bridging between two Token rings, but the MAC bridging MAC address must identify the target port/LAN to replace the information found in the RIF.

The process is a little more complex when a WAN connecting Token rings is to be used for finding the path down to the target T. When a router or a host is on the connection via a WAN such as Frame Relay, the encapsulating technique is used. This means that the WAN net handler is responsible for encapsulating/decapsulating the network header and exchanging a packet with a Token ring stack. In the case of a router, the Token ring stack must support the Source Route Bridging function, so if the bridge MAC address is recognized, the RIF will allow the Token ring packet to be passed to the transmit port. Otherwise, normal Token ring net handler process is run, and the packet will be passed to layer 3, for instance to the IP stack for classical IP routing.

When bridging to a WAN, there are as many ports/LANs as virtual channels so the RIF may identify, for instance, a DLCI. The transmit side net handler will understand that information, add the network header, and transmit on the virtual channel.

The ICMP redirects and ARP exchanges described in the invention do not have to be encapsulated in Token rings packets when going to the WAN. Also, traditional WAN IP traffic (e.g. Frame Relay NLPIDxCC) can still be routed by the router the traditional way. If the router has a bridged connection to the destination via a WAN, it may encapsulate the packet in a Token ring fashion and transmit it over the bridge connection.

Figure 8:
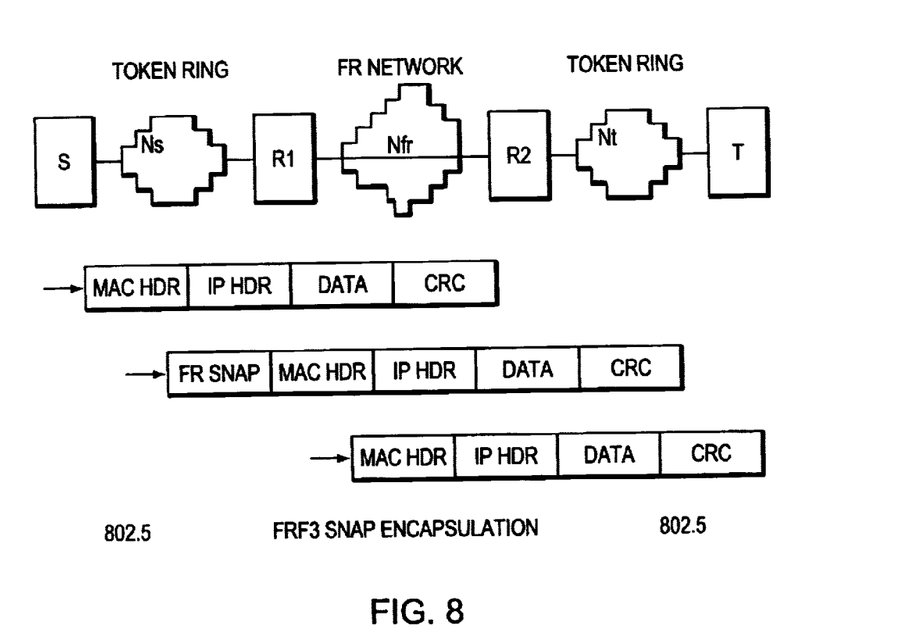
FIG. 8 illustrates an application of this invention to a extended network including a WAN on the path between source and target hosts.

FIG. 8 illustrates the Internet extension with Token ring type networks on both sides of a Frame Relay (FR) network (Nfr). First Token ring network connects the source S to a first router R1. The second Token ring network attaches the Target host T to router R2. The Frame Relay network attaches routers R1 and R2. Also represented in this figure are the packet formats. On both sides the layer 2 MAC headers shall include the RIFs. The transmit side network handler on R1, using RIF information encapsulates the packet with FRF3 snap header and pushes the packet over the right virtual channel. Meanwhile a new frame checking character (CRC) is calculated to replace the former CRC. On the FR network exit, the frame is decapsulated and converted back into conventional Token ring form.

The above description enables a man skilled in the art to appreciate the many advantages of this invention which may also extend further and be combined, for instance with the cited copending Application. In this case, a conventional translational bridge shall help interconnecting both Ethernet and Token ring networks, for instance.

What is claimed is:

1. A method for improving high speed traffic operation in an internet environment using standardized protocols of the so-called Internet Protocol (IP) suite, by speeding up data packet transfers between a source host (S) attached to a first Token ring Local Area Network (LAN) (N1), and a target host (T) within a subnet attached to a different Token ring LAN (N2), both LANs being interconnected by a so-called router (R) establishing connections at so-called OSI Standard network level (layer 3) through use of so-called IP table, by dynamically setting, during traffic operation, a single virtual LAN, said method including:

upon first packet being to be sent, said source (S) encapsulating said packet with a conventional Token ring header including RMAC as destination Media Access Control (MAC) address of R, SMAC as source MAC address and an empty Routing Information Field (RIF) as layer 2 information, and IP address of T (TIP) as layer 3 information and pushing said first packet over said first LAN toward said router R;

upon receiving said first packet, R reading its IP table for best match with TIP address whereby the subnet including T is identified; the net handler running an ARP protocol for identifying TMAC address, storing it in its ARP table, substituting MAC header with said TMAC address into said first packet destination MAC address field and forwarding said first packet over N2; and then R sending a conventional Internet Control Message Protocol (ICMP) over N1 as limited broadcast, whereby all hosts, including S, add a direct route toward T's subnet on their interface to N1 ;R configuring itself in Proxy ARP for the defined subnet;

upon second packet being to be sent by S toward T, S passing said second packet to its N1 interface with TIP address, then, S running a conventional Address Resolution Protocol (ARP) by sending an ARP request carried over an All Route Broadcast (ARB), with TIP address, over N1 and R answering with RMAC address and the RIF data leading to N2, then sending the second packet over N1 with TMAC, SMAC, the defined RIF and TIP data;

upon receiving said second packet, R bridging function identifying RIF data, bridging the packet to its net handler toward N2; R's net handler running ARP process to substitute RMAC address to TMAC address, whereby a bridged LAN has been constructed, with T subnet being virtually attached to N1 and R performing as a bridge for connecting S to T.

2. A method for improving high speed traffic operation in a network according to claim 1 said method being further characterized in that said router R had been predefined as so-called default router for internetwork connections to N1.

3. A method according to claims 1 for improving high speed traffic operation in an internet environment using standardized protocols of the so-called Internet Protocol (IP) suite, by speeding up data packet transfers between a source host (S) attached to a first Local Area Network (LAN) (N1), and a target host (T) attached to a different LAN (N2), said method being further characterized in that said LANs N1 and N2 being both token ring networks are provided with conventional 802.5 headers.

4. A method according to claim 3 wherein said target (T) is connected to a Token ring LAN N, and said source (S) is connected to a LAN $N_0$, with a cascade of LANs ($N_1$, $N_2$, ..., $N_{n-1}$) in-between, interconnected by routers $R_1$, $R_2$, $R_{n-1}$, respectively, with said T subnet and RIF data being progressively defined and reported upward towards the source S upon successive packets transmissions from S whereby said routers bridgings are defined progressively.

5. A method according to claim 4 for improving high speed traffic operation in an internet environment using standardized protocols of the so-called Internet Protocol (IP) suite, by speeding up data packet transfers between several source hosts attached to different Local Area Networks and a target host (T) and further characterized in that said RIF field contents and routers bridgings are successively performed upwardly throughout consecutive packets transmission only to non yet bridged routers.

6. A method according to claim 4 for improving high speed traffic operation in an internet environment using standardized protocols of the so-called Internet Protocol (IP) suite, by speeding up data packet transfers between several source hosts attached to different Local Area Networks and a target host (T) with said RIF field contents and routers bridgings being successively performed upwardly throughout consecutive packets transmission only to non yet bridged routers and up to progressively filling-up the predefined RIF field.

7. A method for improving high speed traffic operation as in claim 1 through 6, said method being further characterized in that said ARP protocols are ran on a predefined time basis for those subnet addresses detected through the ICMP redirect operation and, if ARP fails, then performing the following operations:

deleting the ICMP redirect added entry to the lost subnet from the routing table;

having the router removing all the bridge entries to the failed resources and not providing anymore Proxy ARP function for the lost subnet;

sending a conventional ICMP redirect over the networks from which a bridge existed to the failed resource, now providing the next hop indirect route found in the routing table with the ICMP redirect being again a limited broadcast specifying the right next hop router.

8. A method for improving high speed traffic operation in a system as defined in claim 6 further extended to a WAN by including a Frame Relay between two consecutive routers Ri and Ri+1, said method including providing the net handler with encapsulating/decapsulating means for conventionally encapsulating each packet entering the WAN with a conventional WAN header and appending to said encapsulated packet, a so-called recomputed crc, and means for decapsulating the packet and redefining the CRC accordingly at the exit port.

9. A method for improving high speed traffic operation in a system as defined in claim 8 wherein said encapsulation is made as a conventional FRF3 snap header by the transmit side network handler on Ri using the RIF data carried by the layer 2 MAC headers.

* * * * *